Nov. 12, 1935.    DE CLERMONT DUNLAP    2,020,540
MONORAIL MOTOR TRUCK
Filed March 14, 1934    5 Sheets-Sheet 1
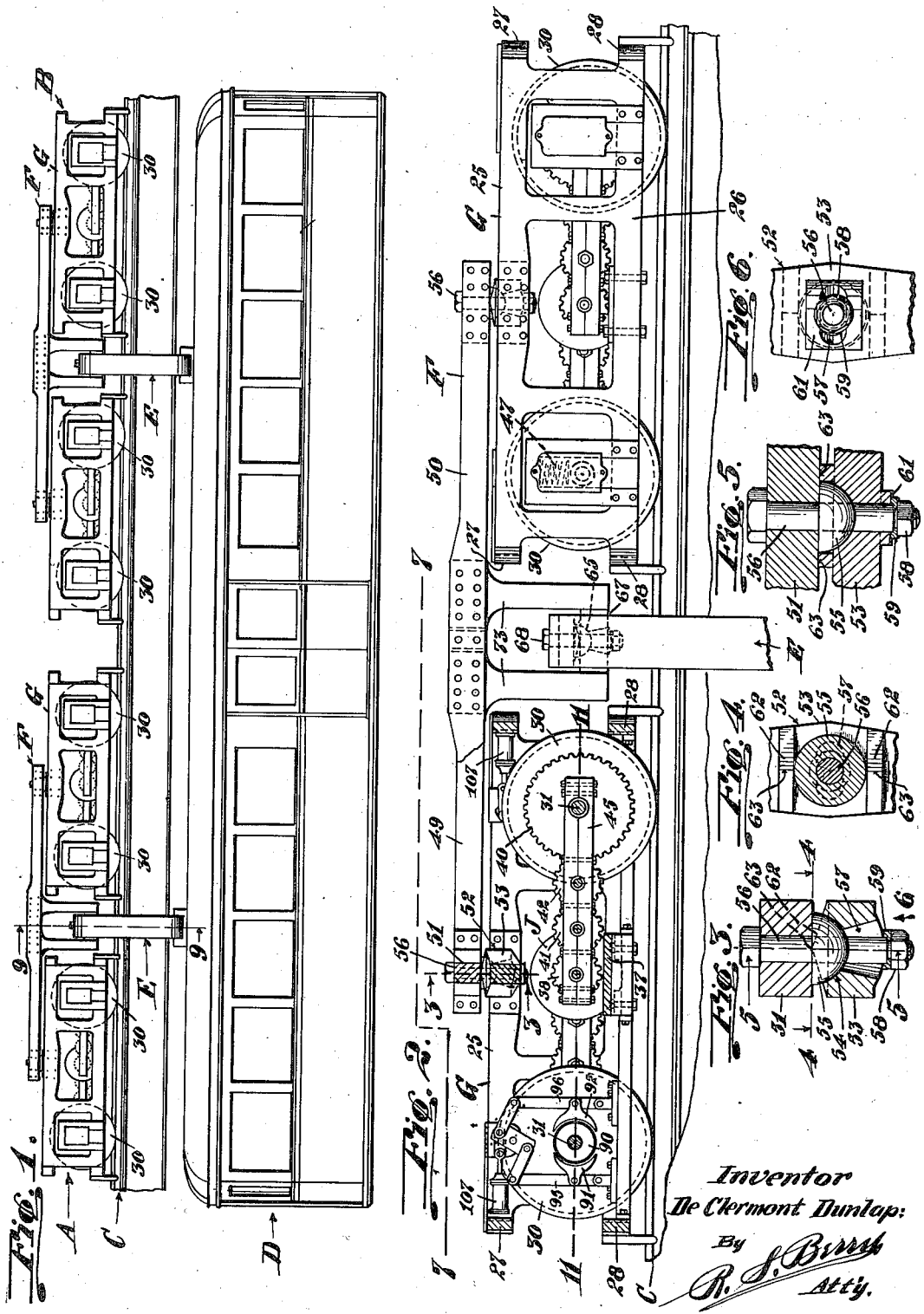
Inventor
De Clermont Dunlap:
By R. S. Burry
Atty.

Nov. 12, 1935.  DE CLERMONT DUNLAP  2,020,540
MONORAIL MOTOR TRUCK
Filed March 14, 1934    5 Sheets-Sheet 2
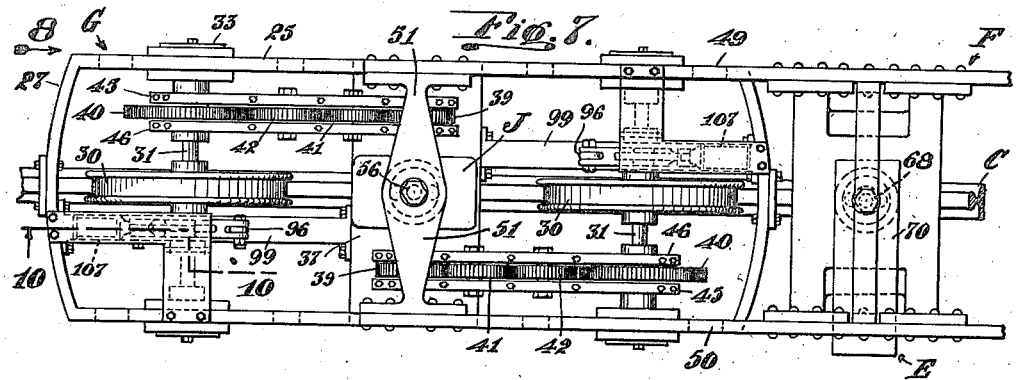
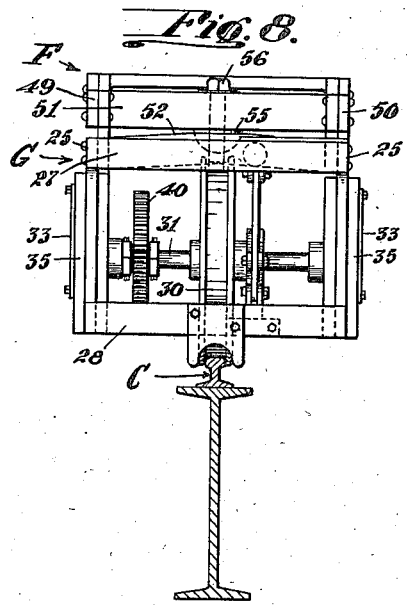
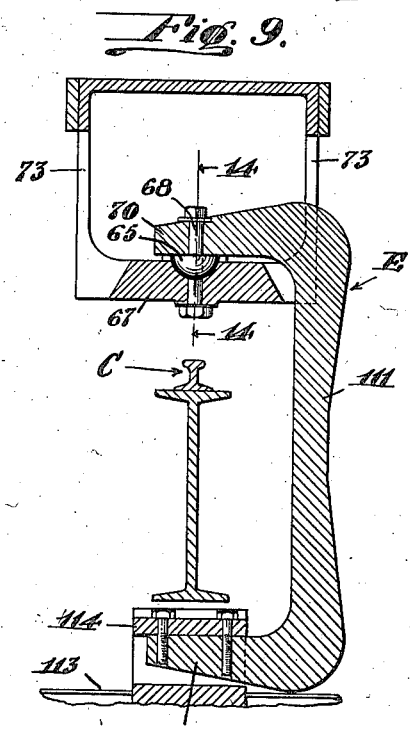
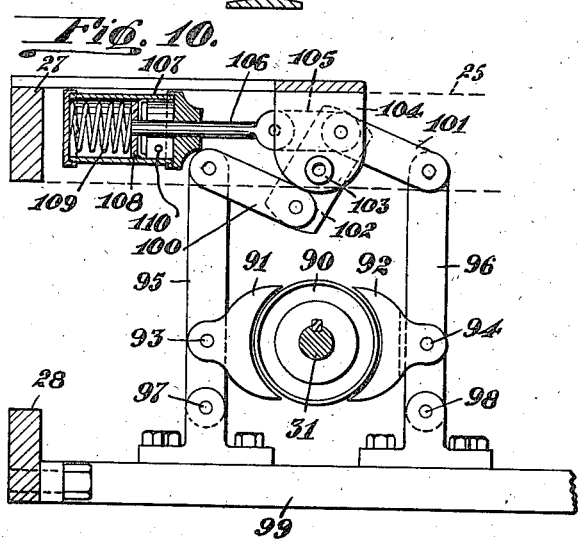
Inventor
De Clermont Dunlap:
By R. S. Berry
Atty.

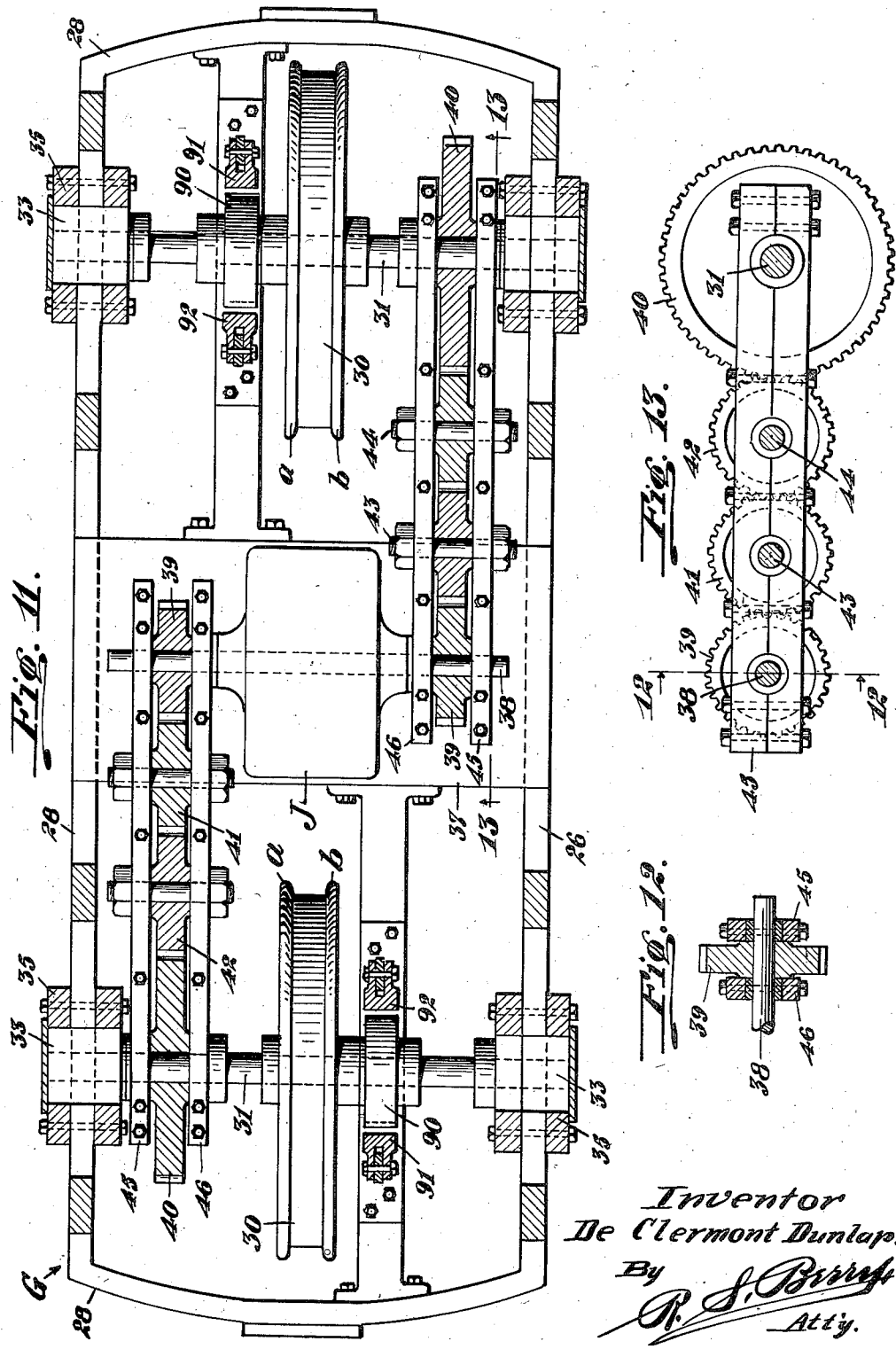

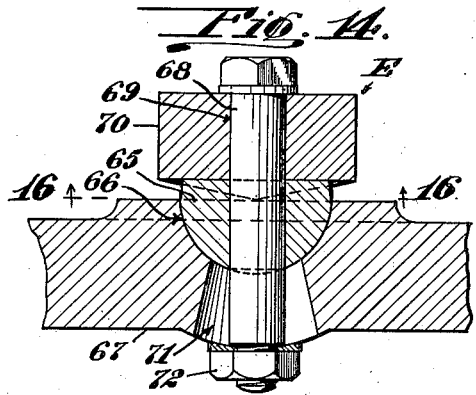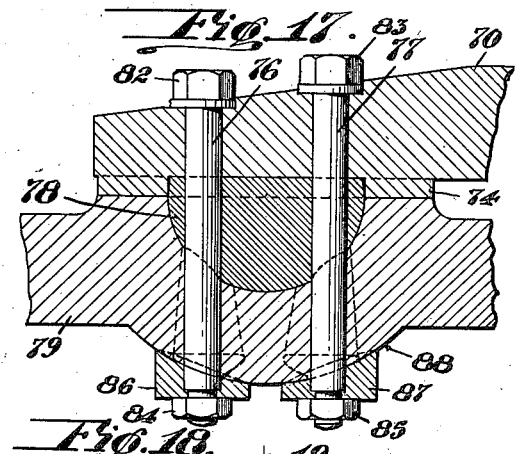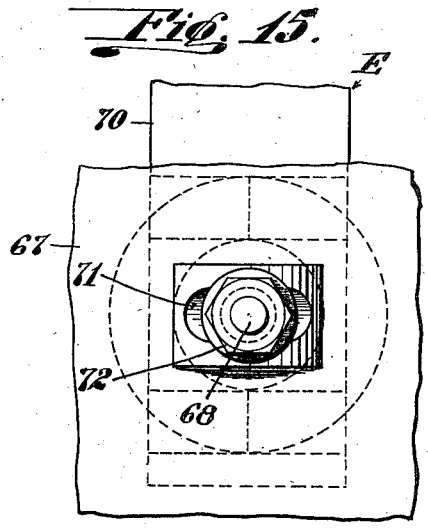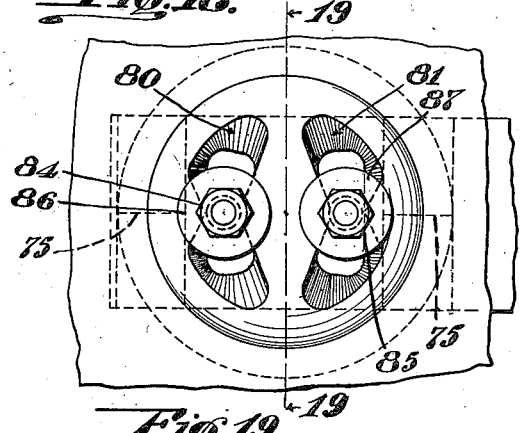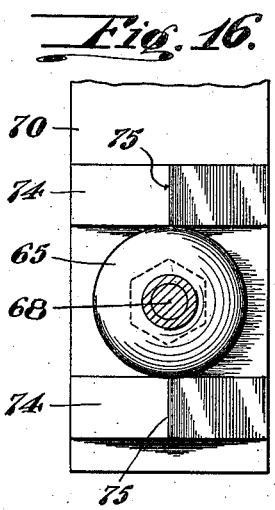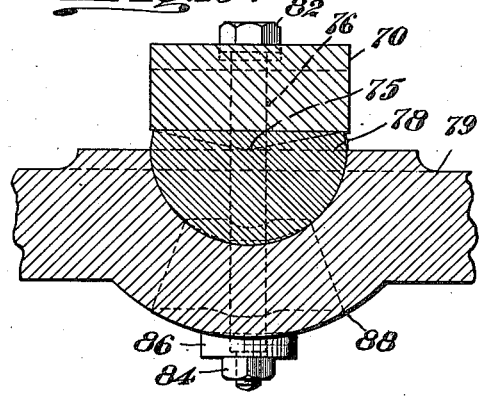

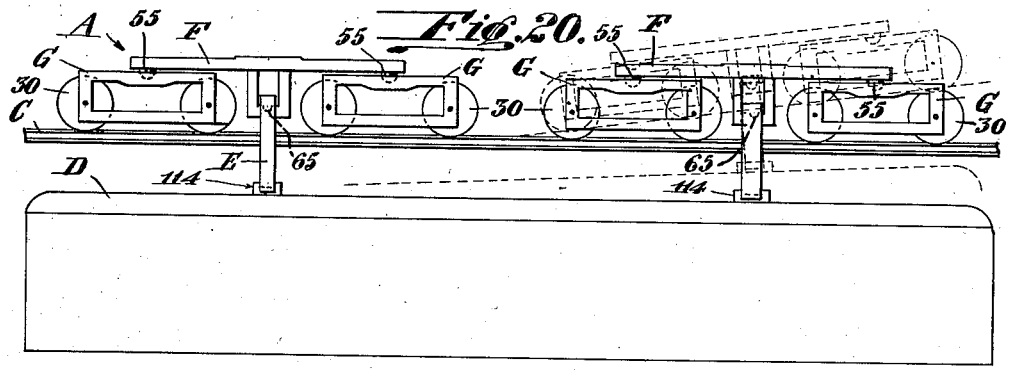
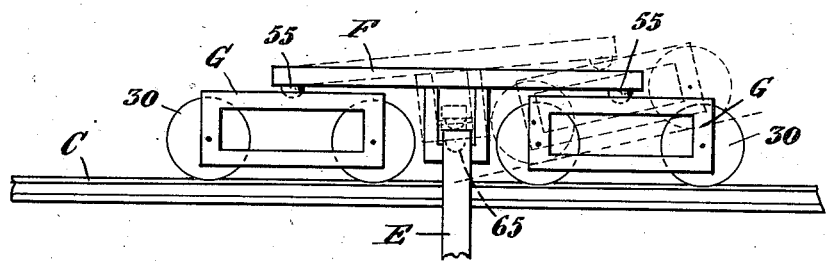
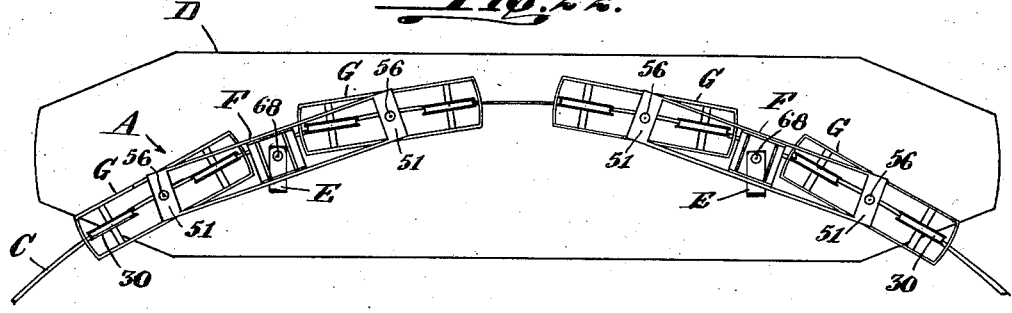

Patented Nov. 12, 1935

2,020,540

UNITED STATES PATENT OFFICE 2,020,540

MONORAIL MOTOR TRUCK

De Clermont Dunlap, Newark, N. J.

Application March 14, 1934, Serial No. 715,397

15 Claims. (Cl. 105—152)

The present invention particularly pertains to the running gear of a monorail transportation system and especially relates to a wheeled truck adapted to traverse a single rail track, and to the means for supporting a suspended car from the truck, whereby the car is disposed in a dependent position beneath a monorail track and the truck maintained on the track primarily by stable equilibrium.

An object of the invention is to provide a monorail truck having a long wheel base whereby the weight of a depending coach or car will be distributed over a considerable length of the monorail, and a particular object is to provide an articulate construction of the truck and its connection to the suspended car whereby the running gear will have such flexibility as to permit it to readily traverse comparatively short curves and varying inclinations of the track, and also travel over small uneven places in the track without excessive jar being imparted to the car.

Another object is to provide a monorail truck embodying a main truck frame on which a depending car is carried, and including a pair of wheeled truck frames adapted to traverse a single rail track and on which the main truck frame is supported, in which means are provided whereby both vertical and horizontal pivotal movement may be had between the main truck frame and the wheeled truck frames, and also between the main truck frame and its connection with the depending car.

Another object is to provide a running gear for a monorail transportation system which is adapted to support depending coaches of considerable length and in which the parts are so constructed and arranged as to permit their ready adaptation to both curves and inclinations in a monorail track being traversed thereby.

Another object is to provide an articulate joint for use between the main truck frame and the wheeled truck frame, and the main truck frame and a depending car-supporting hanger, which will afford a substantial bearing for the loads imposed thereon and yet admit of ready pivotal movement of the joint on a vertical plane in one direction.

Another object is to provide a monorail truck embodying a plurality of aligned wheels in which each of the wheels may be propelled from a motor carried on the truck, and which is so constructed as to permit ready assemblage of the parts.

A further object is to provide a monorail truck embodying a series of wheels adapted to traverse a single-rail track in which the wheels are so spaced and connected to each other, and the connection with the depending load carried by the truck so arranged as to effect a substantially equal distribution of the weight of the load to the track throughout the several wheels of the truck.

With the foregoing objects in view together with such other objects and advantages as may subsequently appear, the invention resides in the parts, and in the construction, combination and arrangement of parts hereinafter described and claimed, and illustrated by way of example in the accompanying drawings, in which:

Figure 1 is a view in side elevation of a monorail coach and its supporting trucks showing the invention as applied;

Figure 2 is a view of a coach supporting truck as seen in side elevation, with portions broken away showing parts thereof in section;

Figure 3 is a detail in vertical section taken on the line 3—3 of Figure 2, showing the articulate connection between the main truck frame and a wheeled truck on which the main frame is carried;

Figure 4 is a horizontal section and plan view taken on the line 4—4 of Figure 3;

Figure 5 is a detail in section as seen on the line 5—5 of Figure 3;

Figure 6 is an inverted plan view as seen in the direction indicated by the arrows 6 in Figure 3;

Figure 7 is a plan view of a portion of the truck as seen on the line 7—7 of Figure 2;

Figure 8 is an end view of the truck as seen in the direction indicated by the arrow 8 in Figure 7;

Figure 9 is a detail in vertical section as seen on the line 9—9 of Figure 1 showing the manner of suspending the car on the main truck frame;

Figure 10 is a view in section and elevation taken on the line 10—10 of Figure 7 showing the manner of equipping the truck with a brake;

Figure 11 is a view of the truck as seen in horizontal section on the line 11—11 of Figure 2, with parts shown in plan;

Figure 12 is a detail in section as seen on the line 12—2 of Figure 13;

Figure 13 is a view in section and elevation as seen on the line 13—13 of Figure 11;

Figure 14 is a detail in section as seen on the line 14—14 of Figure 9 showing the articulate joint and bearing employed in connecting the suspended car to the main truck frame;

Figure 15 is an inverted plan view of the structure shown in Figure 14;

Figure 16 is a view in section and inverted plan as seen on the line 16—16 of Figure 14.

Figure 17 is a view in vertical section illustrating a modified form of the articulate joint and bearing shown in Figure 14;

Figure 18 is an inverted plan view of the structure shown in Figure 17;

Figure 19 is a view in cross section as seen on the line 19—19 of Figure 18;

Figure 20 is a diagrammatic view in side elevation illustrating the manner of carrying the suspended car from a pair of trucks, and showing in dotted lines the relative movement of the trucks in traversing an inclined rail;

Figure 21 is a diagram in side elevation of one of the trucks showing the manner in which vertical articulation between the main truck frame and the wheeled truck frame is effected; and Figure 22 is a plan view illustrating the manner in which the wheeled truck frame, main truck frame, and coach suspension, articulate horizontally relatively to each other on traversing a curve.

Referring to the drawings more specifically, A and B indicate a pair of longitudinally spaced monorail trucks, C designates a monorail track on which the trucks are adapted to travel, and D designates a coach or car which is suspended from the trucks A and B by means of bent hangers E whereby the coach is supported in a dependent position from the trucks and disposed beneath the track C. Each of the trucks A and B embodies a main truck frame F and a pair of complementary wheeled truck frames G which are disposed in tandem relation to each other and are connected together by means of the main truck frame F on which latter the hanger E is supported. Each of the truck frames G embodies a pair of side frames comprising a top rail 25 and a bottom rail 26 suitably connected together; the side frames being connected together by end rails 27 and 28 extending in continuation of the rails 25 and 26.

Each of the truck frames G is fitted with a pair of aligned traction wheels 30 adapted to traverse the monorail track C; the wheels 30 being here shown as formed with side flanges a and b to extend on opposite sides of the rail C to retain the wheels in place on the rail while traversing same. The wheels 30 are fixed on driven shafts 31 carried in journal boxes 33 mounted for vertical movement in suitable guide-ways 35 carried on the truck framed side members.

Carried on the lower rail 26 of the side frame intermediate the ends thereof is a platform 37 on which is mounted a motor J which embodies a drive shaft 38 having its ends projecting from opposite sides of the motor and on each end of which is mounted a spur pinion 39 which is geared to a toothed wheel 40 on each of the shafts 31 through a pair of inter-meshing idler gears 41 and 42, whereby on operation of the motor J each of the wheels 29 will be driven through the train of gears 39, 41, 42 and 40. The idler gears 41 and 42 are revolubly mounted on shafts 43 and 44 carried on a pair of links 45 and 46 which extend on opposite sides of the pinion 39 and toothed wheel 40 and are carried on the shafts 38 and 31. The guide-ways 35 carrying the journal boxes 33 are slightly curved on an arc concentric with the center of the motor drive-shaft 38 to permit oscillation of the links in event of vertical movement of the shafts 31 and their journal boxes 33 relative to the truck frame.

Interposed between the journal boxes 33 and the upper end walls of the guide-ways 35 are helical springs 47 which serve to yieldably transmit the load carried on the truck frame to the wheeled trucks, and act to yieldably oppose and cushion vertical movement of the wheels relative to the truck frame. It is evident that by the construction just described the truck wheels 30 on each of the wheeled truck frames G are adapted to have independent vertical movement relative to the truck frames, which, with the cushion action of the springs 47 serve to permit the travel of the truck over small uneven places in the track without excessive jar being imparted to the car suspended from the truck.

The main truck frame F embodies a pair of spaced side rails 49 and 50 which are connected together at their ends by beams 51 which extend over transverse beams 52 carried on the upper side rails 25 of the truck frames G; the end beams 51 of the main truck frame being pivotally supported on the wheeled truck frames G at the point of intersection of planes extending through the longitudinal and transverse centers of the wheeled trucks, which point is located approximately midway between the wheels 30 whereby the load imposed on the main truck frame will be borne equally by each of the truck wheels on each of the wheeled trucks.

The connection of the end beams 51 of the main truck frame to the wheeled truck frames constitutes an important feature of the present invention and comprises a construction whereby the main truck frame will be supported in a seated position on the wheeled truck frames in such manner that the wheeled truck frames may have both vertical and horizontal pivotal movement relative to the main truck frame, and whereby each of the wheeled truck frames may have their respective movement independent of each other, thus giving the truck a desired flexibility, whereby it may readily traverse short curves and varying inclinations of the track C. This connection is particularly shown in Figures 3, 4, 5 and 6 and comprises a block 53 carried by the transverse beam 52 which block is formed with a socket 54 having a curvature which will conform to a portion of a sphere, and which socket forms a seat for a substantially semi-spherical bearing member 55 projecting from the under side of the beam 51 and which bearing member is adapted to rotate horizontally in the socket 54 and also to rock therein.

The beam 51 carries a downwardly projecting king pin 56 which is in the form of a headed bolt and extends downwardly through an opening formed in the beam 51 to receive it with the head thereof seating on the upper face of the beam 51. The pin 56 projects axially through the semi-spherical bearing member 55 and has its lower end portion projecting through a slot 57 in the block 53 which slot is elongated in the direction of the length of the wheeled truck frame to permit the latter to rock vertically on a plane extending longitudinally through the center thereof; the side walls of the slot 57, however, slidably contacting the lower end portion of the king pin to hold the wheeled truck frame against lateral rocking movement relatively to the main truck frame. Vertical rocking movement of the bearing member 55 and socket 54 relatively to each other is thus confined to one direction, but horizontal turning movement of the bearing member in the socket is unlimited. The lower end of the king pin 56 projects beyond the under side of the block 53 and has a nut 58 screwed thereon which nut bears against a washer 59 arranged to span the lower end of the slot 57 and to bear on the under side of the block 53. The lower face of the block 53 is curved as indicated at 61, being formed on an arc of a circle concentric with the center of the spherical bearing member 55; the arcuate face 61 being curved in the direction of the length of the elongated slot 57, as shown in Figures 3 and 6, so as to form a bearing for the washer 59 on the under side of the block 53 throughout the range of movement of the block 53 relatively to the lower end portion of the king pin 56.

As a means for relieving the king pin 56 of lateral bending strains, the upper face of the block 53 is formed with a pair of upwardly extending tapered projections 62 arranged on opposite sides of the bearing member 55 contiguous thereto, the peaks 63 of which projections slidably abut against the under side of the beam 51 at points on a plane extending diametrically through the king pin 56, which projections, while permitting longitudinal vertical rocking movement of the wheeled truck frame relatively to the main truck frame, will serve to inhibit lateral rocking movement of the wheeled truck frame relatively to the main truck frame.

The hangers E are connected to and supported on the main truck frame F through the medium of a vertically oscillatory and horizontally revoluble bearing member, which may be constructed either as shown in Figures 14 to 16 or in Figures 17 to 19, and which bearing member corresponds in effect to the bearings between the main truck frame and the wheeled truck frames as just described. The bearing member shown in Figures 14 to 16 embodies a semi-spherical body 65 seated in a socket 66 on a block 67, and a king pin 68 passed through an opening 69 in a bracket 70 formed on the upper end of the hanger E, the lower portion of which pin passes through an elongated slot 71 in the bottom wall of the socket 66 and is held in place by a nut 72. The block 67 is supported on downwardly extending brackets 73 on the main truck frame, and is so positioned on the latter that the vertical axis of the bearing will be disposed in alignment with the axes of the bearings between the main truck frame and the wheeled truck frames, which axes are normally disposed on a vertical plane extending through the longitudinal center of the rail C.

The center of vertical oscillation of the bearing is located on a horizontal plane below the centers of oscillations of the bearings between the main truck frame and the wheeled truck frames, being here shown as disposed substantially on a plane extending horizontally through the axis of the truck wheels, it being desirable to dispose the point of connection between the hanger of the main truck frame comparatively close to the rail C, since the closer the depending load carried by the truck is to the plane of the bearing surface of the wheels of the latter, the greater the stability obtained. The slot 71 extends in the direction of the length of the truck so as to limit oscillatory movement of the hanger E and the main truck frame F relative to each other in one direction, and to inhibit oscillation of the hanger E in a direction transversely of the truck so that on lateral swinging of the car D, as in traversing curves, the truck will rock laterally with the swinging movement of the car. The underside of the bracket 70 is formed with a pair of tapered projections 74 arranged on opposite sides of the bearing member 65 the apices 75 of which slidably contact the upper face of the block 67 at points on a plane extending through the longitudinal center of the bearing member 65, and in line with the center of oscillation of the bearing member. These projections serve as stops, as do the side walls of the slot 71, to confine vertical oscillation of the hanger E and the frame F relatively to each other to a direction of the length of the car D.

In the form of the hanger bearing shown in Figures 17 to 19 a pair of pins 76 and 77 are employed in effecting connection between the semi-spherical bearing member 78 and its supporting block 79 which construction is employed where the bearing is of such dimensions that a single king pin would be impractical. The pair of pins 76 and 77 extend through the bracket 70 of the hanger, and are carried through the semi-spherical bearing member 78 on opposite sides to the center thereof, and are continued through a pair of arcuate slots 80 and 81 formed in the block 79; the slots 80 and 81 being formed of such contour as to permit rotation of the bearing 78 relatively to the block 79 a limited distance and also permit lateral rocking movement of the bracket 70 a limited distance in the direction of the length of the suspended car. The pins 76 and 77 are here shown as being in the form of bolts the heads 82 and 83 of which bear on the upper face of the hanger bracket 70, and the lower ends of which have nuts 84 and 85 screwed thereon which bear against washers 86 and 87 slidably seating on an arcuate face 88 formed on the under side of the block 79. The tapered projections 74 on the underside of the hanger bracket 70 are disposed so that the apices 75 thereof extend on a plane passing through the centers of the pair of pins 76 and 77 as indicated in dotted lines in Figures 18 and 19.

The hanger E is thus suspended from the main truck frame F at a point between the wheeled truck frames G intermediate the articulate connections between the ends of the main truck frame and the pairs of wheeled truck frames so that the load suspended by the hangers will be imposed on the truck centrally thereof.

It will be seen from the foregoing that the main truck frame F and the depending hanger E may have vertical oscillatory movement relative to each other on planes extending longitudinally thereof, but are held against transverse movement in relation to each other while at the same time they may have horizontal pivotal movement relative to each other, which, with the affording of corresponding movements between the main truck frame and the wheeled truck frame gives the truck great flexibility so that a truck of comparatively long wheel base may readily traverse curves of short radius, and also travel over varying inclinations in the track without imparting excessive jar or shock to the suspended car.

As a means for effecting a braking action to retard or stop movement of the truck each of the shafts 31 on which the wheels 30 are mounted is fitted with a brake drum 90 and arranged on opposite sides thereof is a pair of brake shoes 91 and 92 pivotally mounted at 93 and 94 on upstanding links 95 and 96 pivoted at 97 and 98 at their lower ends to a beam 99 carried by the wheeled truck frame. The upper ends of the links 95 and 96 pivotally connect with links 100 and 101 which extend inwardly and connect with a cross-arm 102 pivoted at 103 on a depending bracket 104 carried by the truck frame, and which cross-arm is connected by a link 105 to the outer end of a piston rod 106 extending into a cylinder 107 and fitted with a piston 108 within the latter. A spring 109 arranged within the cylinder 107 bears against the piston 108 and normally maintains the latter in a retracted position in which the brake shoes 91 and 92 will be disposed out of operative engagement with the brake drum 90. The brakes are applied by directing fluid pressure into the cylinder 107 in front of the piston 108 through a port 110 in a usual manner, whereby the piston 108 will be caused to move in opposition to the spring 107 thereby rocking the cross-arm 102 in such direction as to exert a pull on the upper ends of the links 95 and 96 and thereby advance the brake shoes 91 and 92 into frictional engagement with the brake drum 90.

The hanger E may be of any suitable construction and may be applied to the car D in any suitable manner but is essentially of substantially of the form shown in Figure 9, that is, with a vertically extending body portion 111 from the upper end of which projects the horizontally extending bracket 70, before referred to, and from the lower end of which projects in alignment with the bracket 70, a horizontal bracket 112 connected to the roof structure 113 of the car D through a connection indicated generally at 114. The connection may be of any suitable construction, but is essentially located directly beneath the pivotal support of the hanger E on the truck frame F.

In the application of the invention the car or coach D is preferably suspended from a pair of the trucks as shown in Figure 1, but by reason of the several vertical oscillatory and horizontally pivotal connections provided in the truck, the number of trucks employed may be increased.

The operation of the invention will be readily understood on referring to Figures 20, 21 and 22; Figure 20 illustrating in dotted lines the manner in which relative vertical oscillatory movement of the hanger E and main truck frame F will be effected when one of the trucks from which the car is suspended is positioned on a length of track that is inclined relative to the portion of the track on which the other truck is supported; Figure 21, illustrating in dotted lines the manner in which the wheeled truck frames G and the main truck frame F may have vertical rocking movement relative to each other as one of the wheeled trucks is positioned on a length of track disposed at an angle to a length of track on which the other wheeled truck is supported; and Figure 22 illustrating the manner in which the hangers E, main truck frame F, and the wheeled truck frames G may swing horizontally relatively to each other when the trucks are traversing a curved track.

In effecting propulsion of the truck electrical current is directed to the motors J to operate the latter whereby the shafts 31 carrying the traction wheels 30 will then be driven through the gear connection between the shafts 31 and the motor drive shaft 38 as before described.

It will be apparent that by the use of this invention, cars of considerable length may be adequately supported and operated on an overhead monorail track.

While I have shown and described a specific embodiment of my invention I do not limit myself to the exact details of construction and arrangement shown but may employ such modifications in the details of construction of the parts and their relative arrangement as occasion may require without departing from the spirit and scope of the invention as defined, and coming within the meaning of, the appended claims.

I claim:

1. In a monorail truck, a main truck frame, a wheeled truck frame on each end of said main truck frame, and a depending bent hanger connected to said main truck frame intermediate its ends; said wheeled truck frames and hanger adapted to have vertical articulate movement relative to the main truck frame, and also adapted to have horizontal pivotal movement relative to the main truck frame.

2. A monorail truck comprising a main truck frame, a pair of wheeled truck frames supporting the end portions of the main truck frame, a bent hanger suspended from the main truck frame at a point between the wheeled truck frames for supporting a load suspended below the truck, there being a connection between each of the wheeled trucks and the main truck frame and between the hanger and the main truck frame which will permit both relative vertically oscillatory movement and horizontal pivotal movement between the main truck frame and the wheeled truck frames and between the main truck frame and the hanger.

3. In a monorail truck, a main truck frame, a pair of wheeled trucks supporting said main truck frame and connected to the end portions of the latter, a pair of aligned wheels on each of said wheeled truck frames adapted to traverse a single rail track, a connection between each of the wheeled trucks and the main truck frame adapted to permit both vertically oscillatory movement and horizontal pivotal movement of the wheeled truck frames relative to the main truck frame, a bent hanger depending from the main truck frame intermediate the wheeled truck frames adapted to carry a load suspended beneath the truck, and a connection between said hanger and the main truck frame which will permit both vertical oscillatory movement and horizontal pivotal movement between the said hanger and said main truck frame.

4. In a monorail truck, a main truck frame, a pair of wheeled trucks supporting said main truck frame and connected to the end portions of the latter, a pair of aligned wheels on each of said wheeled truck frames adapted to traverse a single rail track, a connection between each of the wheeled trucks and the main truck frame adapted to permit both vertical oscillatory movement and horizontal pivotal movement of the wheeled truck frames relative to the main truck frame, a hanger depending from the main truck frame intermediate of the wheeled truck frames adapted to carry a load suspended beneath the truck, and a connection between said hanger and the main truck frame which will permit both vertical oscillatory and horizontal pivotal movement between said hanger and said main truck frame; the vertical oscillation between the main truck frame and the wheel truck frames being limited to a plane longitudinally of the wheel truck frame and the vertical oscillation between the hanger and the main truck frame being limited to a plane longitudinally of the main truck frame.

5. In a monorail truck, a main truck frame, a wheeled truck frame supporting each end of said main truck frame, a pair of wheels on each of said wheeled trucks arranged in alignment and adapted to traverse a single rail track, a bearing connection between the wheeled truck frames and the main truck frame adapted to permit relative vertical oscillatory movement between the wheeled truck frames and the main truck frame, said bearing connection being located at a point on a plane intermediate said wheels and on a plane above the axes of said wheels, and a bent hanger suspended from said main truck frame adapted to have vertical oscillatory movement and horizontal pivotal movement relative to said frame, said hanger being connected to said frame at a point intermediate said wheeled truck frames and on a plane below the plane of the connection between the wheeled truck frames and the main truck frame.

6. In a monorail truck, a main truck frame, a wheeled truck frame supporting each end of said main truck frame, a pair of wheels on each of said wheeled trucks arranged in alignment and adapted to traverse a single rail track, a bearing connection between the wheeled truck frames and the main truck frame adapted to permit relative vertical oscillatory movement between the wheeled truck frame and the main truck frame, and also permit horizontal pivotal movement between the wheeled truck frames and the main truck frame, said bearing connection being located at a point on a plane intermediate said wheels and on a plane above the axis of said wheels, and a bent hanger suspended from said main truck frame adapted to have vertical oscillatory movement and horizontal pivotal movement relative to said frame, said hanger being connected to said frame at a point intermediate said wheeled truck frames and on a plane below the plane of the connection between the wheeled truck frames and the main truck frame, the plane of said connection between the said hanger and the main truck frame being in alignment with the normal horizontal plane of the axes of said wheels.

7. In a monorail truck, a main truck frame, wheeled truck frames supporting the ends of said main truck frame, means for pivotally connecting said wheeled truck frames to said main truck frame, said means comprising a substantially semi-spherical member seating in a socket in the wheeled truck frame for both horizontal and vertical turning movement in said socket, a king pin extending through said member and through an elongated slot in said socket, and a nut on the lower end of said pin arranged beneath the wall of said socket for securing said member within said socket.

8. In a monorail truck, a main truck frame, wheeled truck frames supporting the ends of said main truck frame, means for pivotally connecting said wheeled truck frames to said main truck frame, said means comprising a substantially semi-spherical member seating in a socket in the wheeled truck frame, means for securing said member to said main truck frame and within said socket, said last named means adapted to permit both vertical oscillatory movement and horizontal pivotal movement between said wheeled truck frames and the main truck frame, and a pair of tapered elements interposed between said frames adjacent opposite sides of said member to prevent vertical oscillatory movement of said frames transversely thereof.

9. In a monorail truck, a main truck frame, wheeled truck frames supporting the ends of said main truck frame, means for pivotally connecting said wheeled truck frames to said main truck frame, said means comprising a substantially semi-spherical member seating in a socket in the wheeled truck frame, means for securing said member to said main truck frame and within said socket, said last named means adapted to permit both vertical oscillatory movement and horizontal pivotal movement between said wheeled truck frames and the main truck frame, and means whereby the vertical oscillatory movement will be confined to a vertical plane extending in a direction of the length of the wheeled truck frame.

10. In a monorail truck, a main truck frame, a wheeled truck frame, a socket member carried by the wheeled truck frame having an elongated slot in the bottom wall of the socket, a substantially semi-spherical member seated in said socket connected to the main truck frame, said member being adapted for both horizontal and vertical turning movement in said socket, and a pin on said member extending into the elongated slot.

11. In a monorail truck, a main truck frame, a wheeled truck frame, a socket member carried by the wheeled truck frame having an elongated slot in the bottom wall of the socket, a substantially semi-spherical member seated in said socket connected to the main truck frame, a pin on said member extending into the elongated slot, and means engaging said pin for securing said member within said socket adapted to permit vertical rocking movement of said member in said socket and also permit turning movement of said member in said socket around the axis of said stem.

12. In a monorail truck, a main truck frame, wheeled truck frames supporting said main truck frame and connected to the latter to have both vertical oscillatory and lateral swinging movement relative thereto, a bent hanger depending from said truck frame for suspending a car from said main truck frame, a semi-spherical member connected to said hanger seating in a socket in said main truck frame, said socket being disposed substantially on the plane of the axes of wheels on said wheeled truck frames, and means for holding said member within said socket adapted to permit said member to have vertical oscillatory movement and horizontal pivotal movement within said socket.

13. In a monorail transportation system, the combination of an elevated single rail track, a plurality of trucks adapted to traverse said track, a main truck frame embodied in each of said trucks, a plurality of wheeled truck frames adapted to traverse a single rail track and connected to each of said main truck frames to have vertical articulate movement and horizontal pivotal movement relative thereto, a hanger depending from each of said main truck frames connected thereto above said track for both vertical oscillatory movement and horizontal turning movement, and a car carried by said hanger suspended beneath said track.

14. In a monorail transportation system, the combination of an elevated single rail track, a plurality of trucks adapted to traverse said track, a main truck frame embodied in each of said trucks, a plurality of wheeled truck frames adapted to traverse a single rail track and connected to each of said main truck frames to have vertical articulate movement and horizontal pivotal movement relative thereto, a hanger suspended from each of said main truck frames connected thereto for both vertical oscillatory movement and horizontal turning movement, and a car carried by said hangers suspended beneath said track; the vertical oscillation between the main truck frame and the wheel truck frames being limited to a plane longitudinally of the wheel truck frame and the vertical oscillation between the hanger and the main truck frame being limited to a plane longitudinally of the main truck frame.

15. In a monorail truck, an articulate joint comprising a pair of superimposed members the lowermost of which is formed with a socket having an elongated slot opening through the bottom wall thereof, a semi-spherical bearing member seated in said socket affixed to the underside of the uppermost of said members, a pin carried by said uppermost member projecting downwardly through said bearing member and into said elongated slot, means on the lower end of said pin engaging the underside of the bottom wall of said socket to hold said pin against withdrawal from said slot, and means interposed between said members on opposite sides of said semispherical bearing member cooperating with said pin and slot to prevent oscillation of said spherical member in a direction transversely of said slot.

DE CLERMONT DUNLAP.